(12) United States Patent
Shih

(10) Patent No.: US 9,157,263 B2
(45) Date of Patent: Oct. 13, 2015

(54) SUPPORTING FRAME ASSEMBLY HAVING INCLINATION ADJUSTMENT MECHANISM

(71) Applicant: HON HAI PRECISION INDUSTRY CO., LTD., New Taipei (TW)

(72) Inventor: Cheng-Feng Shih, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 55 days.

(21) Appl. No.: 14/139,780

(22) Filed: Dec. 23, 2013

(65) Prior Publication Data

US 2015/0143667 A1    May 28, 2015

(30) Foreign Application Priority Data

Nov. 28, 2013 (TW) .................................. 102143483

(51) Int. Cl.
*F16M 11/38* (2006.01)
*E05D 11/10* (2006.01)

(52) U.S. Cl.
CPC .................................. *E05D 11/1007* (2013.01)

(58) Field of Classification Search
USPC ........... 16/233, 319, 321, 324, 325, 326, 341, 16/342, 345, 349, 371; 248/486, 126, 248/188.6, 351
See application file for complete search history.

(56) References Cited

U.S. PATENT DOCUMENTS

| | | | | |
|---|---|---|---|---|
| 362,305 A | * | 5/1887 | Mix | 16/345 |
| 563,142 A | * | 6/1896 | Donaldson | 16/326 |
| 1,149,212 A | * | 8/1915 | Nueberth | 16/233 |
| 1,255,100 A | * | 1/1918 | McQueen | 16/233 |
| 3,474,991 A | * | 10/1969 | Toubhans | 248/645 |
| 3,568,241 A | * | 3/1971 | Uffner | 16/321 |
| 3,969,788 A | * | 7/1976 | McCullough | 16/326 |
| 6,684,456 B2 | * | 2/2004 | Lee | 16/342 |
| 8,191,838 B2 | * | 6/2012 | Carter | 248/188.6 |
| 8,767,395 B2 | * | 7/2014 | Yoo | 361/679.56 |
| 8,783,641 B2 | * | 7/2014 | Lin et al. | 248/463 |
| 8,876,070 B2 | * | 11/2014 | Liu et al. | 248/188.6 |
| 2002/0088918 A1 | * | 7/2002 | Uto et al. | 248/688 |
| 2010/0071160 A1 | * | 3/2010 | Chang | 16/319 |

* cited by examiner

*Primary Examiner* — Bradley Duckworth
(74) *Attorney, Agent, or Firm* — Novak Druce Connolly Bove + Quigg LLP

(57) ABSTRACT

A supporting frame assembly includes a first module and a second module pivotally connected to the first module. The first and second modules each include a main body, a pair of aligned knuckles formed on one long side of the main body, a pair of aligned pivot pins formed on an opposite long side of the main body, a lock portion formed between the pivot pins, and a sliding block slidably connected to the top of the main body. The sliding block of the first module is movable along the top of the main body between a first position and a second position with respect to the lock portion of the second module. When the sliding block of the first module is located at the second position, the sliding block is fixedly engaged with the lock portion of the second module to limit rotation between the first and second modules.

20 Claims, 4 Drawing Sheets

SUPPORTING FRAME ASSEMBLY HAVING INCLINATION ADJUSTMENT MECHANISM

TECHNICAL FIELD

The present disclosure relates to a supporting frame assembly that can be used with an object such as an electronic device, the supporting frame assembly having an inclination adjustment mechanism to adjust an inclination of the supporting frame assembly and hence a desired orientation of the object.

DESCRIPTION OF RELATED ART

Nowadays, numerous kinds of electronic devices, such as a desktop telephone, a keyboard or a display screen, generally include a supporting bracket mounted on a backside thereof. The electronic device can be firmly positioned on a supporting surface by the supporting bracket.

However, the supporting bracket is generally integrally formed as one monolithic, rigid piece. Accordingly, when placing the electronic device on an uneven supporting surface or in a narrow space, it is hard for the user to precisely adjust the inclination of the electronic device with respect to the supporting surface.

What is needed, therefore, is a supporting means which can overcome the above-mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
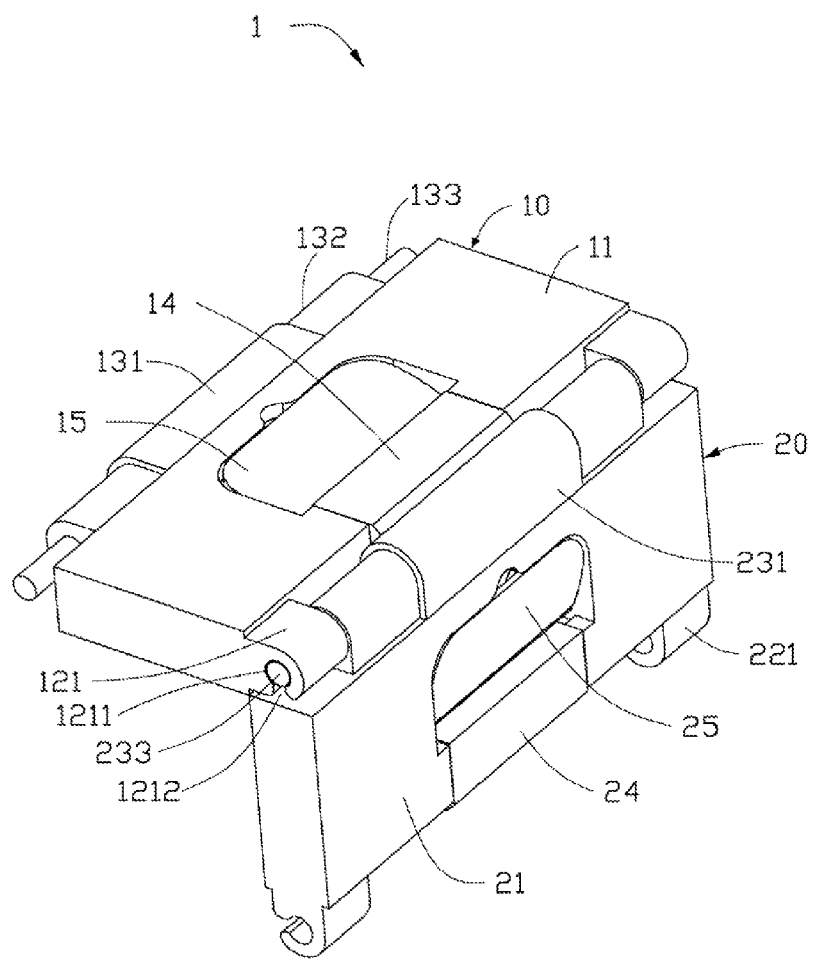
FIG. 1 is an isometric, perspective view of a supporting frame assembly in accordance with a first embodiment of the present disclosure.

Referring to FIG. 1, a supporting frame assembly 1 in accordance with a first embodiment of the present disclosure is illustrated. The supporting frame assembly 1 includes two standard modules; i.e., a first module 10, and a second module 20 pivotally connected to the first module 10. The first and second modules 10, 20 have substantially the same structure. In detail, the first module 10 includes an elongated main body 11, a pair of aligned knuckles 121 formed on one long side of the main body 11, a pair of axially aligned pivot pins 133 formed on an opposite long side of the main body 11, a sliding block 14 slidably connected to the top of the main body 11, and a drive element 15 pivotally connected to the top of the main body 11 and abutting against the sliding block 14. Similarly, the second module 20 includes an elongated main body 21, a pair of aligned knuckles 221 formed on one long side of the main body 21, a pair of axially aligned pivot pins 233 formed on an opposite long side of the main body 21, a sliding block 24 slidably connected to the top of the main body 21, and a drive element 25 pivotally connected to the top of the main body 21 and abutting against the sliding block 24. The pivot pins 233 of the second module 20 are rotatably supported by the knuckles 121 of the first module 10.

Figure 2:
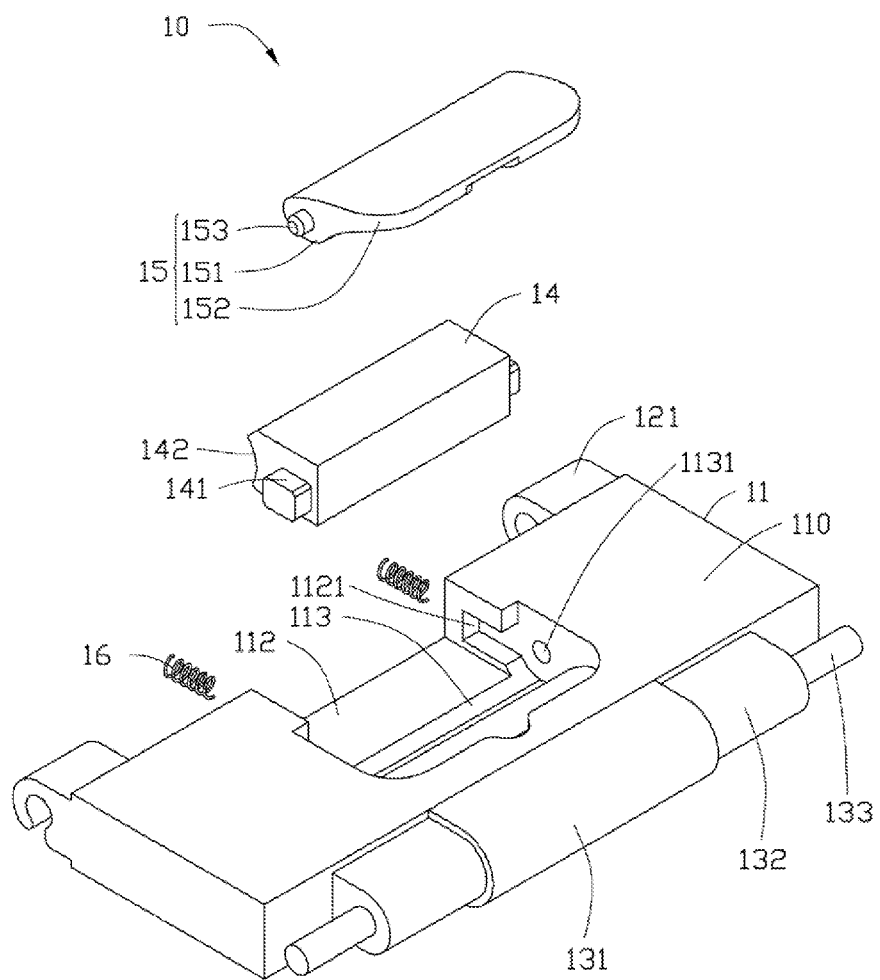
FIG. 2 is an exploded, perspective view of a first module of the supporting frame assembly of FIG. 1.
Figure 3:
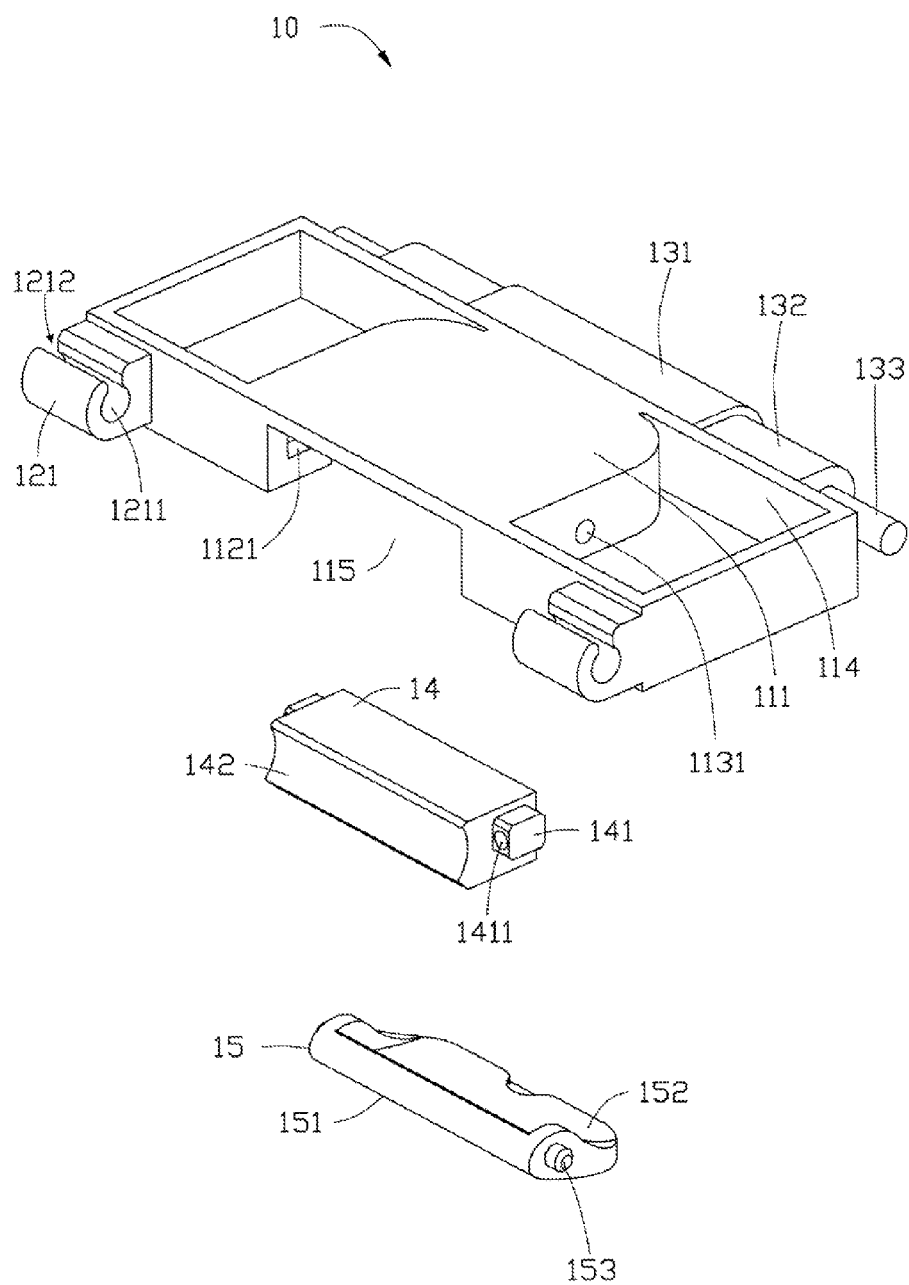
FIG. 3 is an exploded, perspective view of the first module of the supporting frame assembly of FIG. 1 when the first module is inverted, wherein a pair of elastic elements of the first module is omitted for clarity.

Referring also to FIGS. 2 and 3, because the first and second modules 10, 20 have substantially the same structure, this description and the accompanying drawings mainly illustrate the structure of the first module 10.

The main body 11 of the first module 10 is a rectangular block. The main body 11 has a top surface 110 and a bottom surface 111 at opposite sides thereof. The main body 11 defines a first recess 112 and a second recess 113 in the top surface 110 thereof. The first and second recesses 112, 113 communicate with each other. The first recess 112 extends through said one long side of the main body 11 to define a gap 115. The gap 115 is separate from the second recess 113. The main body 11 defines two spaced grooves 114 in the bottom surface 111 thereof. The two spaced grooves 114 are respectively located at opposite ends of the bottom surface 111 of the main body 11.

The main body 11 also defines a pair of pin holes 1131 at opposite inner sides of the second recess 113. The pin holes 1131 are aligned with each other. The second recess 113 communicates with the two spaced grooves 14 through the two pin holes 1131. The main body 11 further defines a pair of guiding slots 1121 at opposite inner sides of the first recess 112. The guiding slots 1121 are parallel to each other. Each of the guiding slots 1121 extends along a widthwise direction of the main body 11 (i.e. perpendicular to the long sides of the main body 11). One of opposite ends of each guiding slot 1121 is open and in communication with the second recess 113, while the other end of each guiding slot 1121 distant from the second recess 113 is closed.

The knuckles 121 are separate from each other, and are aligned with each other along a longitudinal direction of the main body 11. The knuckles 121 are tubular. Each of the knuckles 121 defines a through hole 1211 therein, the through hole 1211 extending axially through the knuckle 121 from one end to the other end. Each knuckle 121 also defines a slit 1212 in a sidewall thereof, the slit 1212 extending radially through the sidewall to communicate with the through hole 1211. A length of the slit 1212 is the same as that of the knuckle 121. A transverse width of the slit 1212 is smaller than a diameter of the through hole 1211 of the knuckle 121.

The first module 10 also includes two spaced fixing portions 132, and a lock portion 131 sandwiched between the fixing portions 132. Each of the fixing portions 132 is a block with a semicylindrical longitudinal side. The pivot pins 133 extend horizontally outwardly from outer ends of the fixing portions 132, respectively. Each pivot pin 133 extends outwardly from the outer end of the corresponding fixing portion 132, along a longitudinal direction of the main body 11 away from the other fixing portion 132. The two pivot pins 133 are axially aligned with each other. Each of the pivot pins 133 has a diameter slightly smaller than that of each through hole 1211, but larger than the width of each slit 1212.

The lock portion 131 is made of plastic material, so as to provide increased surface friction. The lock portion 131 is elastically clamped between the two fixing portions 132. The lock portion 131 is a block with a semicylindrical longitudinal side. The lock portion 131 has a diameter slightly larger than that of each fixing portion 132. Alternatively, the lock portion 131 and the two fixing portions 132 can be integrally formed as one monolithic piece, with the two pivot pins 133 extending horizontally outwardly from two opposite ends of the monolithic piece, respectively.

The sliding block 14 of the first module 10 is approximately rectangular-shaped. A pair of stoppers 141 extends outwardly from two opposite ends of the sliding block 14, respectively. The stoppers 141 each define a receiving hole 1411 therein. The stoppers 141 are slidably received in the guiding slots 1121, respectively. The sliding block 14 has a concave lock surface 142 at one of opposite long sides thereof. The lock surface 142 is engaged with a lock portion 231 of the second module 20 (see FIG. 1). The lock surface 142 faces away from the second recess 113. In the present embodiment, the lock surface 142 has an arc-shaped transverse cross-section. Alternatively, the shape of the lock surface 142 can be changed according to a complementary shape of the lock portion 231 of the second module 20.

The first module 10 further includes a pair of elastic elements 16. The elastic elements 16 are partly received in the two receiving holes 1411 of the stoppers 141, respectively. Each elastic element 16 is elastically connected between the closed end of the corresponding guiding slot 1121 and the inmost end of the receiving hole 1411 of the corresponding stopper 141. In the present embodiment, each elastic element 16 is a compression spring. A length of each elastic element 16 in the free state is larger than that of each guiding slot 1121.

The drive element 15 of the first module 10 includes a semicylindrical cam 151, a pair of rotating pins 153 extending outwardly from two opposite ends of the cam 151, and an operating portion 152 extending slantwise from a long sidewall of the cam 151. The rotating pins 153 are axially aligned with each other. The rotating pins 153 are rotatably received in the pin holes 1131, respectively. An outer periphery of the cam 151 protrudes toward the sliding block 14, and abuts against the other one of the opposite long sides of the sliding block 14. In the present embodiment, the operating portion 152 is substantially in the form of a plate that can be gripped by a user. Alternatively, the operating portion 152 can be a handle.

Referring to FIG. 1 again, the first module 10 is assembled as follows. Firstly, ends of the pair of elastic elements 16 are respectively received in the two receiving holes 1411 of the stoppers 141. Secondly, the sliding block 14, together with the pair of elastic elements 16, is lowered into the first recess 112 until the sliding block 14 is completely slidably received in the first recess 112. That is, the pair of stoppers 141 is slidably received in the guiding slots 1121 located at the opposite sides of the first recess 112. Each elastic element 16 is slightly compressed and connected between the closed end of the corresponding guiding slot 1121 and the inmost end of the corresponding receiving hole 1411. After that, the drive element 15 is lowered into the second recess 113 until the pair of rotating pins 153 is respectively rotatably received in the pin holes 1131. In this position, the protruded outer periphery of the cam 151 abuts against the other long side of the sliding block 14. The second module 20 is assembled in the same manner as that of the first module 10.

The first module 10 is assembled with the second module 20 as follows. Firstly, a pushing force is exerted on the second module 20 to force the pivot pins 233 into the slits 1212 of the knuckles 121 of the first module 10. Accordingly, the knuckles 121 are elastically deformed to expand the transverse widths of the slits 1212 and allow the pivot pins 233 to pass through the slits 1212. The pivot pins 233 of the second module 20 are thus sleeved in the through holes 1211 of the knuckles 121 of the first module 10, as shown in FIG. 1. Accordingly, the first module 10 is rotatable about the pivot pins 233 of the second module 20.

Figure 4:
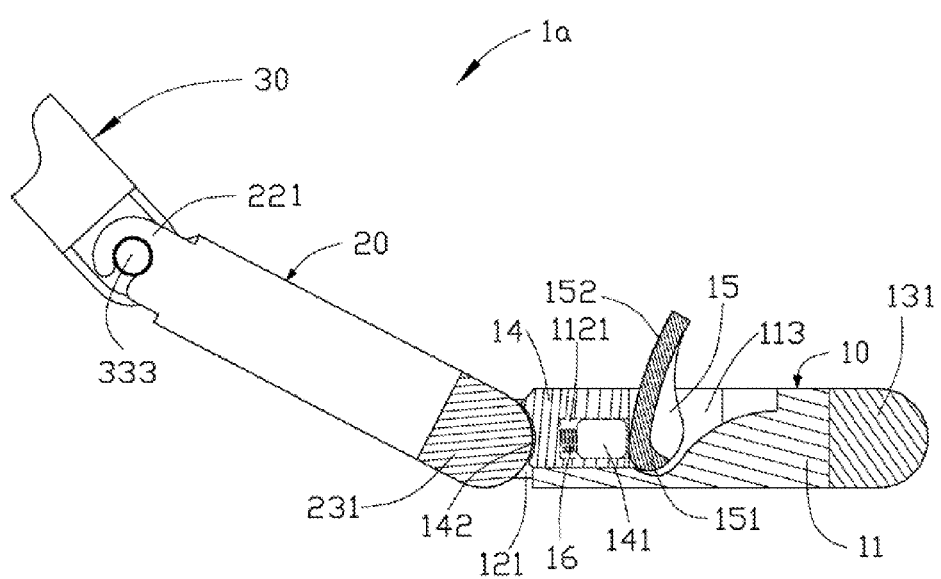
FIG. 4 is a left-side, cutaway view of a supporting frame assembly in accordance with a second embodiment of the present disclosure.

Referring to FIG. 4, a supporting frame assembly 1a in accordance with a second embodiment of the present disclosure is illustrated. Differently from the supporting frame assembly 1 of the first embodiment, the supporting frame assembly 1a includes three standard modules; i.e., a first module 10, a second module 20, and a third module 30. The first, second and third modules 10, 20, 30 have the same structure. The pivot pins 233 (not shown in FIG. 4) of the second module 20 are rotatably supported by the knuckles 121 of the first module 10. A pair of pivot pins 333 of the third module 30 are rotatably supported by the knuckles 221 of the second module 20.

In operation of the supporting frame assembly 1 or the supporting frame assembly 1a, the sliding block 14 of the first module 10 can be driven by the drive element 15 to move along the top of the main body 11 of the first module 10 between a first position and a second position with respect to the lock portion 231 of the second module 20. When the sliding block 14 of the first module 10 moves from the first position to the second position, the lock surface 142 of the sliding block 14 of the first module 10 moves toward the lock portion 231 of the second module 20.

When the sliding block 14 of the first module 10 is located at the first position (see FIG. 4), the operating portion 152 protrudes up beyond the top of the main body 11 of the first module 10. That is, the operating portion 152 is oriented almost vertically. The drive element 15 exerts a slight pushing force on the sliding block 14, such that the sliding block 14 is positioned adjacent to the lock portion 231 of the second module 20. In this position, the elastic elements 16 held in the two receiving holes 1411 are slightly compressed, and provide resilient force to hold the sliding block 14 in the first position.

In the embodiment, when the sliding block 14 of the first module 10 is located at the first position, the lock surface 142 of the sliding block 14 is separate from the lock portion 231 of the second module 20, as shown in FIG. 4. Thus the first module 10 can freely rotate about the pivot pins 233 of the second module 20.

The sliding block 14 of the first module 10 is moved from the first position to the second position by pushing the operating portion 152 down. The operating portion 152 is then completely received in the second recess 113 of the first module 10. That is, the operating portion 152 becomes oriented almost horizontally, as shown in FIG. 1. In this process, the cam 151 of the drive element 15 exerts a considerable pushing force on the other long side of the sliding block 14 to drive the sliding block 14 to move toward the lock portion 231 of the second module 20, until the lock surface 142 of the sliding block 14 is fixedly engaged with the lock portion 231 of the second module 20. Such engagement limits rotation between the first and second modules 10, 20. In one embodiment, the engagement prevents rotation between the first and second modules 10, 20; and rotation can only occur when the operating portion 152 is lifted up to release the sliding block 14 from the lock portion 231.

It is convenient for a user to precisely adjust an angle between each two adjacent standard modules 10, 20, 30. For example, when the sliding block 14 of the first module 10 is located at a position somewhere between the first position and the second position, the first module 20 is freely rotatable about the pivot pins 233 of the second module 20 in an angular range from about 90 degrees to about 270 degrees. When the angle between the first and second modules 10, 20 is adjusted by the user and reaches a desired angle, then the user presses down the operating portion 152 of the drive element 15 until the operation portion 152 is completely received in the second recess 113 of the first module 10. Accordingly, the sliding block 14 of the first module 10 is driven by the drive element 15 to move toward the lock portion 231 of the second module 20, until the sliding block 14 is located at the second position with respect to the lock portion 231. Thus the lock surface 142 of the sliding block 14 is fixedly engaged with the lock portion 231 of the second module 20, to limit rotation between the first and second modules 10, 20 and maintain the desired angle therebetween.

When there is a need to readjust the angle between the first and second modules 10, 20, the user applies a pulling force on the operating portion 152 of the drive element 15 to lift up the operation portion 152. This releases the lock surface 142 of the sliding block 14 from engagement with the lock portion 231 of the second module 20. Thus the sliding block 14 is driven by resilient force provided by the elastic elements 16 to move away from the lock portion 231 of the second module 20, until the lock surface 142 of the sliding block 14 is separate from the lock portion 231 of the second module 20. Accordingly, the first module 10 is again freely rotatable about the pivot pins 233 of the second module 20.

Similarly, an angle between the second and third modules 20, 30 can be easily adjusted by much the same process as that described above. Thus, the supporting frame assembly 1, 1a provides an inclination adjustment mechanism to precisely adjust an inclination thereof. Furthermore, since the supporting frame assembly 1, 1a includes at least two standard modules 10, 20, 30 pivotally attached to one another, the flexibility of use of the supporting frame assembly 1, 1a is improved. This can be particularly advantageous when, e.g., an electronic device utilizing the supporting frame assembly 1, 1a needs to be placed on an uneven supporting surface or in a narrow space.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A supporting frame assembly comprising:
   a first module; and
   a second module pivotally connected to the first module;
   wherein each of the first and second modules comprises an elongated main body, a pair of aligned knuckles formed on one long side of the main body, a pair of aligned pivot pins formed on an opposite long side of the main body, a lock portion formed between the pivot pins, and a sliding block slidably connected to the top of the main body;
   wherein the pivot pins of the second module are rotatably supported by the knuckles of the first module, and the sliding block of the first module is movable along the top of the main body of the first module between a first position and a second position with respect to the lock portion of the second module; and
   wherein when the sliding block of the first module moves from the first position to the second position, the sliding block of the first module moves towards the lock portion of the second module; and when the sliding block of the first module is located at the second position, the sliding block of the first module is fixedly engaged with the lock portion of the second module to limit rotation between the first and second modules.

2. The supporting frame assembly of claim 1, wherein each of the first and second modules further comprises a drive element pivotally connected to the top of the main body and abutting against the sliding block, and the sliding block is drivable by the drive element to move along the top of the main body.

3. The supporting frame assembly of claim 2, wherein the drive element comprises a semicylindrical cam, a pair of rotating pins extending outwardly from two opposite ends of the semicylindrical cam and being axially aligned with each other, and an operating portion extending slantwise from a long sidewall of the semicylindrical cam.

4. The supporting frame assembly of claim 3, wherein the cam of the drive element abuts against the sliding block connected to the main body, and the rotating pins of the drive element are pivotally connected to the top of the main body.

5. The supporting frame assembly of claim 3, wherein the main body of each of the first and second modules defines a first recess and a second recess, the second recess is located in the top of the main body and communicates with the first recess, the sliding block is slidably received in the first recess of the main body, and the drive element is rotatably received in the second recess of the main body.

6. The supporting frame assembly of claim 5, wherein the first recess extends through one long side of the main body to define a gap in the long side of the main body.

7. The supporting frame assembly of claim 5, wherein the main body of each of the first and second modules defines two spaced grooves in a bottom thereof.

8. The supporting frame assembly of claim 7, wherein the main body of each of the first and second modules further defines a pair of pin holes at opposite inner sides of the second recess to rotatably receive the rotating pins of the drive element, and the second recess of the main body communicates with the two grooves of the main body through the pin holes.

9. The supporting frame assembly of claim 5, wherein the sliding block of each of the first and second modules is approximately rectangular-shaped, a pair of stoppers extends outwardly from two opposite ends of the sliding block, and the main body of each of the first and second modules defines a pair of guiding slots at opposite inner sides of the first recess to slidably receive the stoppers of the sliding block.

10. The supporting frame assembly of claim 9, wherein each guiding slot extends along a widthwise direction of the main body, and one of opposite ends of each guiding slot distant from the second recess is closed.

11. The supporting frame assembly of claim 10, wherein each of the first and second modules further comprises a pair of elastic elements, and the elastic elements are partly received in the guiding slots, respectively.

12. The supporting frame assembly of claim 11, wherein each of the stoppers of the sliding block defines a receiving hole therein, the receiving holes of the stoppers receive ends of the elastic elements therein, respectively, and each elastic element is elastically connected between the closed end of the corresponding guiding slot and the inmost end of the corresponding receiving hole.

13. The supporting frame assembly of claim 11, wherein each elastic element is a compression spring.

14. The supporting frame assembly of claim 1, wherein the pair of knuckles of each of the first and second modules is separate from each other and aligned with each other along a longitudinal direction of the main body, and the pivot pins of the second module are sleeved by the pair of knuckles of the first module.

15. The supporting frame assembly of claim 14, wherein each knuckle is tubular and defines a through hole therein, and the through hole extends axially through the knuckle.

16. The supporting frame assembly of claim 15, wherein each knuckle also defines a slit in a sidewall thereof, and the slit extends radially through the sidewall to communicate with the through hole.

17. The supporting frame assembly of claim 16, wherein a length of the slit is the same as that of the knuckle, and a transverse width of the slit is smaller than a diameter of the through hole of the knuckle.

18. The supporting frame assembly of claim 14, wherein each of the first and second modules further comprises two spaced fixing portions, the lock portion is between the fixing portions, and the pivot pins extends horizontally outwardly from outer ends of the two fixing portions, respectively.

19. The supporting frame assembly of claim 18, wherein the sliding block of each of the first and second modules has a lock surface at one of opposite long sides thereof; and when the sliding block of the first module is located at the second position along the top of the main body of the first module, the lock surface of the sliding block of the first module is fixedly engaged with the lock portion of the second module.

20. The supporting frame assembly of claim 1, further comprising a third module pivotally connected to the second module;

the third module comprising an elongated main body, a pair of aligned knuckles formed on one long side of the main body, a pair of aligned pivot pins formed on an opposite long side of the main body, a lock portion formed between the pivot pins, and a sliding block slidably connected to the top of the main body;

wherein the pivot pins of the third module are rotatably supported by the knuckles of the second module, and the sliding block of the second module is movable along the top of the main body of the second module between a first position and a second position with respect to the lock portion of the third module; and wherein when the sliding block of the second module moves from the first position to the second position along the top of the main body of the second module, the sliding block of the second module moves towards the lock portion of the third module; and when the sliding block of the second module is located at the second position along the top of the main body of the second module, the sliding block of the second module is fixedly engaged with the lock portion of the third module to limit rotation between the second and third modules.

* * * * *